United States Patent [19]

Kahng

[11] Patent Number: 5,081,785
[45] Date of Patent: Jan. 21, 1992

[54] CONNECTOR FOR A FISHING DEVICE

[76] Inventor: Gredo W. Kahng, 1510 Spillers Ln., Houston, Tex. 77043

[21] Appl. No.: 634,040

[22] Filed: Dec. 26, 1990

[51] Int. Cl.⁵ .................. A01K 91/03; A01K 91/04
[52] U.S. Cl. .................... 43/44.83; 43/44.9; 43/43.1; 24/128; 24/908
[58] Field of Search ............ 43/42.08, 43.16, 43.14, 43/43.12, 44.83, 44.82, 44.86, 44.9; 24/128, 908

[56] References Cited

U.S. PATENT DOCUMENTS

| | | | |
|---|---|---|---|
| 1,462,406 | 7/1923 | Zajic | 43/44.86 |
| 3,535,815 | 10/1970 | Lowndes | 43/43.12 |
| 3,834,061 | 9/1974 | Klein | 43/44.9 |
| 3,857,645 | 12/1974 | Klein | 43/44.9 |
| 3,898,760 | 8/1975 | Klein | 43/44.83 |

FOREIGN PATENT DOCUMENTS 793  1/1884  United Kingdom ............... 43/44.83

Primary Examiner—Richard K. Seidel
Assistant Examiner—Jeanne M. Elpel
Attorney, Agent, or Firm—Donald H. Fidler

[57] ABSTRACT

A fishing device including a fishing body member and an attachment portion. The attachment portion has elongated flat surfaces with spaced apart openings where the openings having differently sized diameters, i.e. one opening is larger than the other. The smaller opening is appropriately sized to permit threading the line through the smaller opening and is tapered or frusto conically shaped so that the end of a fishing line is easily insertible through the larger opening and so that the fishing line knot can be made in the line after it exits from the small end of the tapered opening.

1 Claim, 1 Drawing Sheet

CONNECTOR FOR A FISHING DEVICE

FIELD OF THE INVENTION

This invention relates to a connector for simply attaching a fishing line to a fishing device and more particularly to a connector requiring only a single knot for the attachment of a fishing line to a fishing device.

BACKGROUND OF THE INVENTION

Fishing is a popular past time which typically requires the use of a rod, a reel, a fishing line and one or more attached fishing devices such as artificial lures, hooks, sinkers, float swivels, snaps and so forth. The fishing devices are attached to the fishing line by a knot in the fishing line. Knots for attaching fishing devices are many in number and include such knots known as a King Sling, snelling, uni-knot, square knot and so forth, all of which require a certain amount of manual dexterity, sometimes keen eyesight, patience, as well as some skill. Fishing hook design has been much the same since the basic design was originated in 1832. In the present invention, a new and simplified connector arrangement for attaching fishing devices to a fishing line is provided.

SUMMARY OF THE PRESENT INVENTION

A fishing device includes a fishing body member and an attachment portion. The attachment portion has elongated flat surfaces relative to a longitudinal axis with spaced apart openings disposed along said longitudinal axis. The openings having differently sized diameters, i.e. one opening is larger than the other. The smaller opening is appropriately sized to permit threading the line through the smaller opening. Once passed through the opening, a simple overhand knot is tied in the line. The tied knot is larger in size than the smaller opening so that the attachment portion is secured to the line by the knot engaging the wall of the attachment portion.

The attachment can be on the shank of a fishing hook, a sinker or weight, a float, a swivel or the like. In a modified form, the attachment portion can have a width dimension which is sufficient to permit location of the openings so that the axes of the openings are located transverse to the width dimension. The openings can be elongated in the the attachment portion. The smaller diameter opening can be tapered or frustrum shaped so that the end of a fishing line is easily insertible through the larger opening and so that the fishing line knot can be made in the line after it exits from the small end of the tapered opening.

DESCRIPTION OF THE INVENTION

Figure 1:
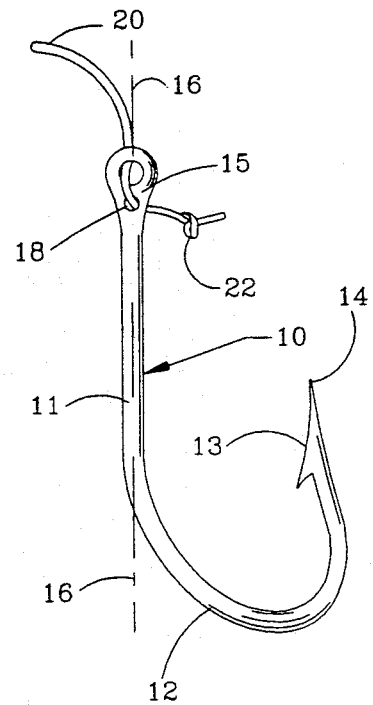
FIG. 1 is a side view of a fishing hook.
Figure 2:
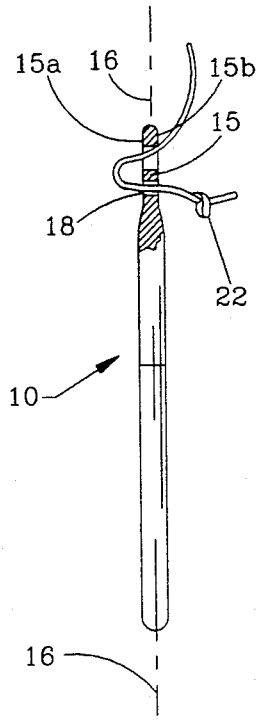
FIG. 2 is an end view of FIG. 1.

Referring now to the drawings, in FIG. 1 and FIG. 2 are the side and end views of a fishing hook 10 which has a shank 11, a bend 12, a barb 13 and a point 14. The shank extends along a longitudinal axis 16. At the end of the shank 11 is a flattened attachment portion 15 having approximately parallel surface portions 15a and 15b. Located in the attachment portion 15 along the longitudinal axis 16 are spaced apart holes 17 and 18 where one hole 17 is larger in diameter than the other hole 18. The larger opening may be any convenient size to readily accept passage of and threading of a fishing line 20. The smaller opening 18 is sized to be slightly larger than cross section of the fishing line 20 but large enough for easy threading. The fishing line 20 is passed from one side of the attachment portion 15 through the larger hole 17 to the other side of the attachment portion 15. Then the fishing line 20 is passed through the smaller hole 18 and the line 20 can be tied in an overhand knot 22. The diameter of the opening or hole 18 relative to the diameter of the fishing line 20 is related to the size of an overhand knot in the line so that the knot 22 will prevent return of the line 20 through the opening 18. When the line 20 is pulled to adjust or bring the knot 22 into contact with the attachment portion 15, the attachment portion 15 will not slide relative to the line 20. As shown in FIG. 2, the attachment portion 15 is flattened to provide sufficient metal area for the holes 17 and 18. The advantage of the two hole system is that the attachment portion will not slide on the line and the angler can rapidly attach the fishing device to the line. Conversely, to remove the device, the knot is simply cut off and the device is then easily detached.

Figures 3, 4:
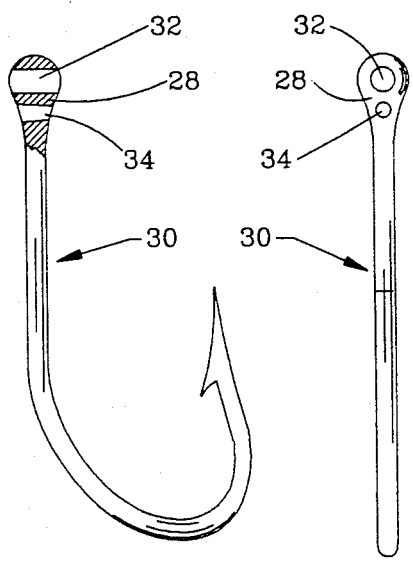
FIG. 3 is a side view of a modified form of the invention in a hook.
FIG. 4 is an end view of FIG. 3.

In FIG. 3, a different form of attachment portion 28 is illustrated on a fishing hook 30. In FIGS. 3 and 4, the attachment portion 28 is an enlarged bead portion with a thickness such that the larger hole 32 and the smaller hole 34 have a length dimension sufficient to provide a tapered opening. The length dimension of the smaller hole permits the smaller hole 34 to be tapered or frusto conical so that a line can easily be threaded into the larger opening of the tapered hole 34 and be sized more closely to the bore of the smaller opening of the hole 34. This facilitates easier threading of a fishing line. It is to be noted that the use of larger openings permits easy threading of a fishing line even with poor eyesight or poor light.

Figure 5:
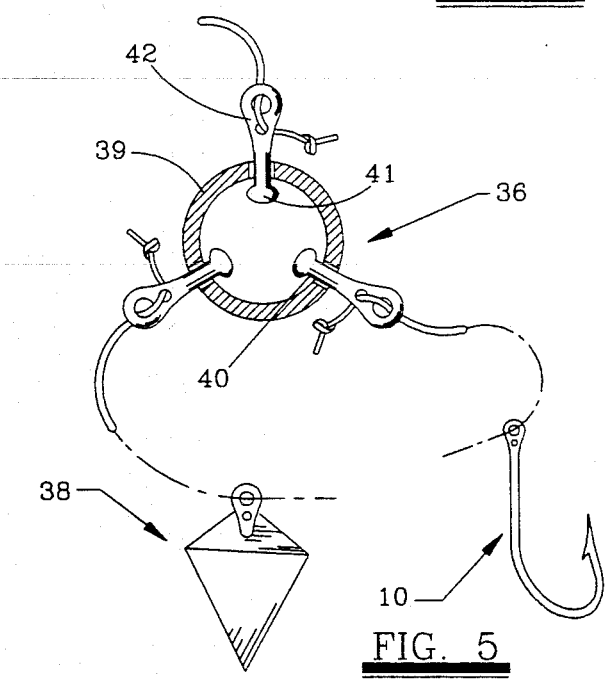
FIG. 5 is a plan view of a swivel connector for connecting a number of fishing devices.
Figure 6:
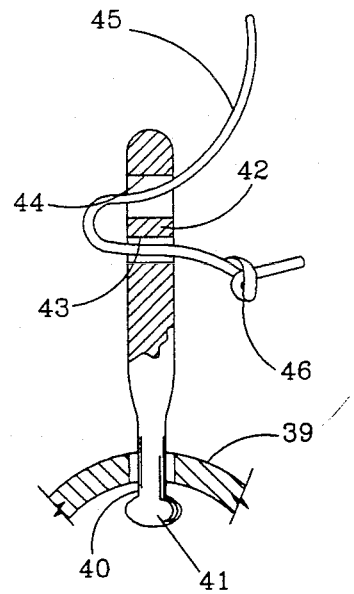
FIG. 6 is a view in cross section through another modified form of the invention.

FIGS. 5 and 6 illustrate an adaptation of the attachment portion to a ring swivel 36, and to a sinker 38. The swivel 36 includes a ring member 39 with circumferentially arranged holes to receive the pin shanks 40 of swivel pins 42. A pin end 41 retains the pins 42 in the swivel 36 and at the outer ends of shanks 40 are attachment portions 42 which have spaced apart holes as previously described with respect to FIG. 1 or FIG. 3. A sinker or weight 38 can be provided with an attachment member. Similarly, a hook 10 can be attached by a fishing line to the swivel 36.

As shown in FIG. 6, an attachment portion 42 can have a thickness sufficient to enable a tapered opening 43 and a larger opening 44. The openings 43 and 44 permit easy threading of a line 45 and provide an undersized opening for the overhand knot 46 when tension is applied to the line.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A fishing device connector system wherein the fishing device has an elongated rigid attachment portion disposed along a longitudinal axis, said attachment portion having spaced apart transverse openings disposed along said longitudinal axis with said openings being sized to receive a fishing line, one of said openings having a papered wall surface with an entrance diameter portion sized to readily accept a smaller diameter fishing line and with an exit diameter portion sized only slightly larger than the diameter of the fishing line so that the fishing line is easily passed through said one opening from the larger entrance diameter portion to the smaller exit diameter portion and so that a knot can be tied in the fishing line at a location adjacent to said exit diameter portion to provide an obstruction for securing said fishing line to said attachment portion, and said other opening having an entrance diameter portion sized which is larger in diameter than said exit diameter portion and has a diameter to readily accept easy passage of the fishing line through said other opening.

* * * * *

UNITED STATES PATENT AND TRADEMARK OFFICE
CERTIFICATE OF CORRECTION

PATENT NO. : 5,081,785

DATED : January 21, 1992

INVENTOR(S) : Gredo W. Kahng

Page 1 of 3

It is certified that error appears in the above-identified patent and that said Letters Patent is hereby corrected as shown below:

The title page showing the illustrative figures should be deleted to be replaced with the attached title page.

In the drawings Figures 1, 2, 3, 4 and 6, should be deleted to be replaced with the corrected Figures 1, 2, 3, 4 and 6, as shown on the attached page.

Signed and Sealed this

Fourth Day of January, 1994

*Attest:*

BRUCE LEHMAN

*Attesting Officer*     *Commissioner of Patents and Trademarks*

United States Patent [19]

Kahng

[11] Patent Number: 5,081,785
[45] Date of Patent: Jan. 21, 1992

[54] CONNECTOR FOR A FISHING DEVICE

[76] Inventor: Gredo W. Kahng, 1510 Spillers Ln., Houston, Tex. 77043

[21] Appl. No.: 634,040

[22] Filed: Dec. 26, 1990

[51] Int. Cl.⁵ .................. A01K 91/03; A01K 91/04
[52] U.S. Cl. .................................. 43/44.83; 43/44.9; 43/43.1; 24/128; 24/908
[58] Field of Search ............... 43/42.08, 43.16, 43.14, 43/43.12, 44.83, 44.82, 44.86, 44.9; 24/128, 908

[56] References Cited

U.S. PATENT DOCUMENTS

| 1,462,406 | 7/1923 | Zajic | 43/44.86 |
| 3,535,815 | 10/1970 | Lowndes | 43/43.12 |
| 3,834,061 | 9/1974 | Klein | 43/44.9 |
| 3,857,645 | 12/1974 | Klein | 43/44.9 |
| 3,898,760 | 8/1975 | Klein | 43/44.83 |

FOREIGN PATENT DOCUMENTS 793  1/1884  United Kingdom ............ 43/44.83

Primary Examiner—Richard K. Seidel
Assistant Examiner—Jeanne M. Elpel
Attorney, Agent, or Firm—Donald H. Fidler

[57] ABSTRACT

A fishing device including a fishing body member and an attachment portion. The attachment portion has elongated flat surfaces with spaced apart openings where the openings having differently sized diameters, i.e. one opening is larger than the other. The smaller opening is appropriately sized to permit threading the line through the smaller opening and is tapered or frusto conically shaped so that the end of a fishing line is easily insertible through the larger opening and so that the fishing line knot can be made in the line after it exits from the small end of the tapered opening.

1 Claim, 1 Drawing Sheet

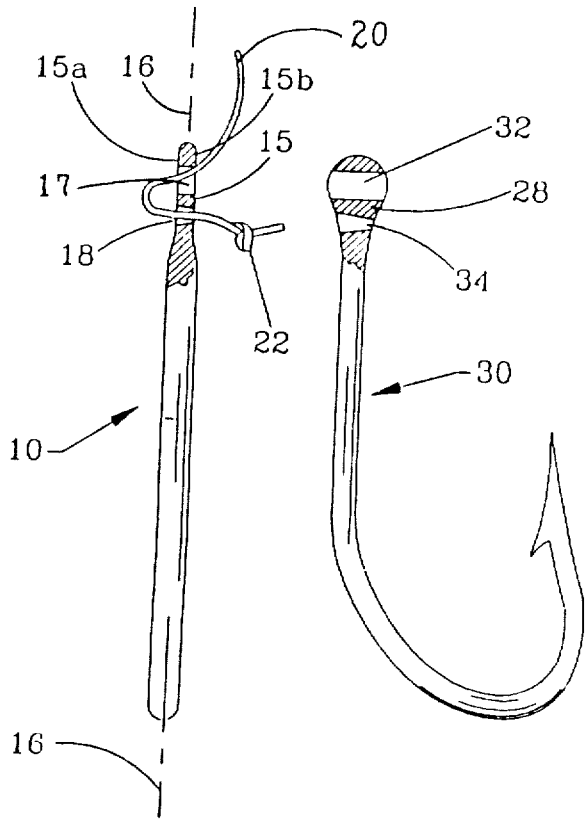

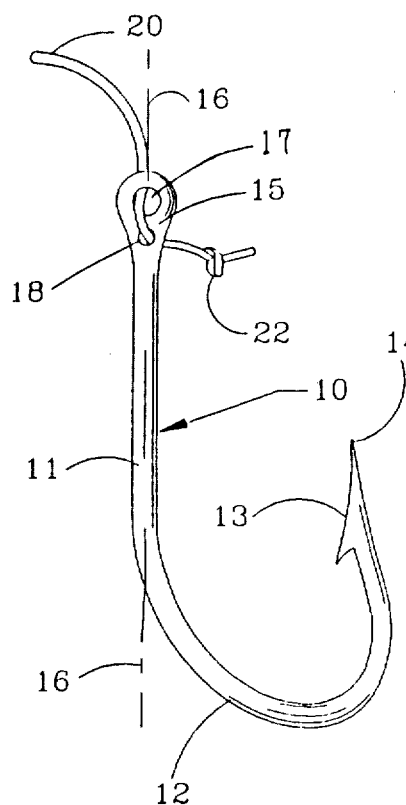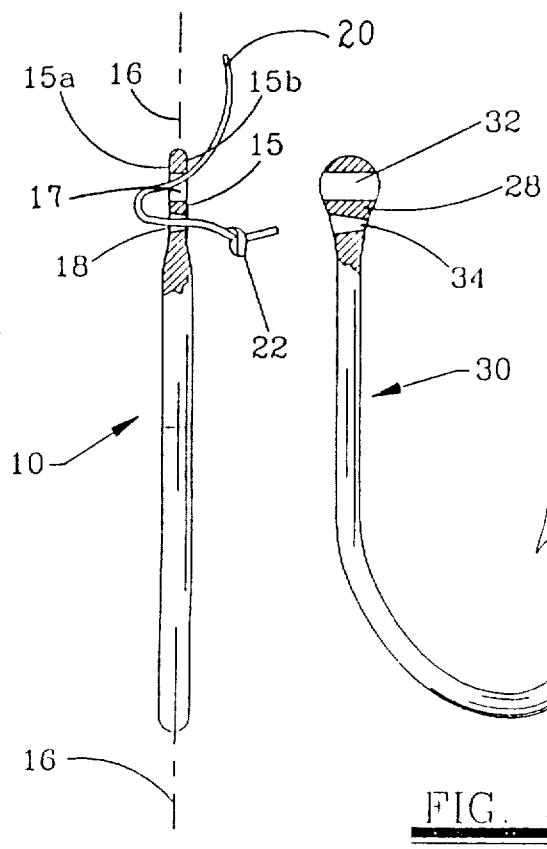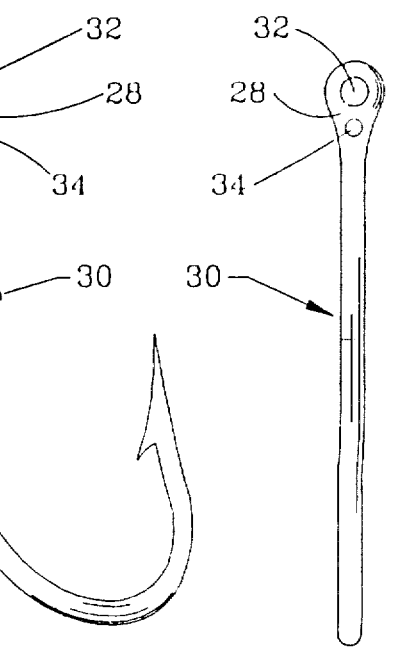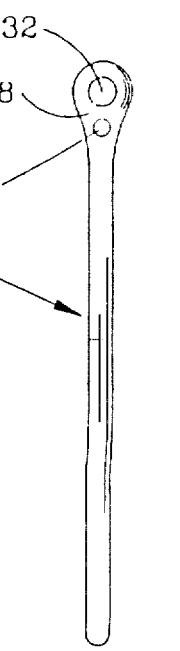
FIG. 1      FIG. 2      FIG. 3      FIG. 4
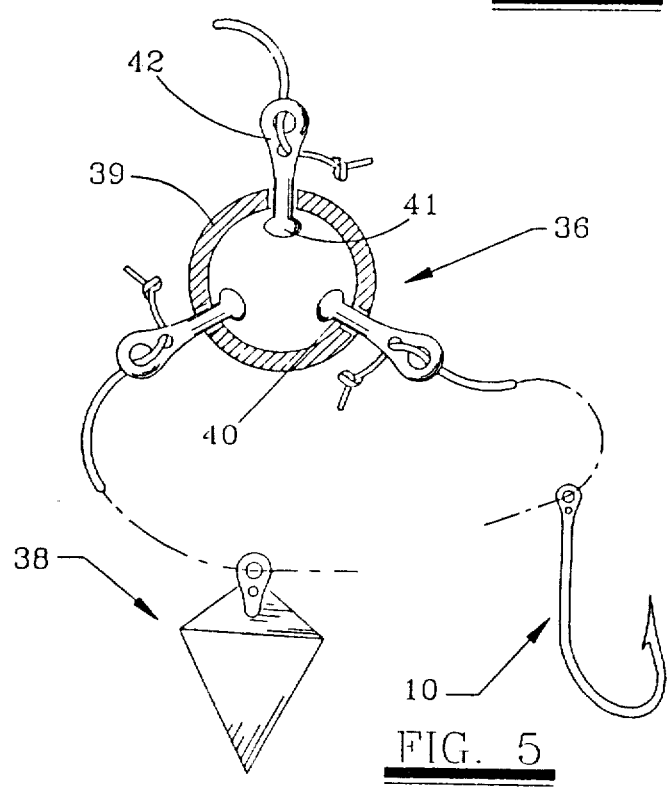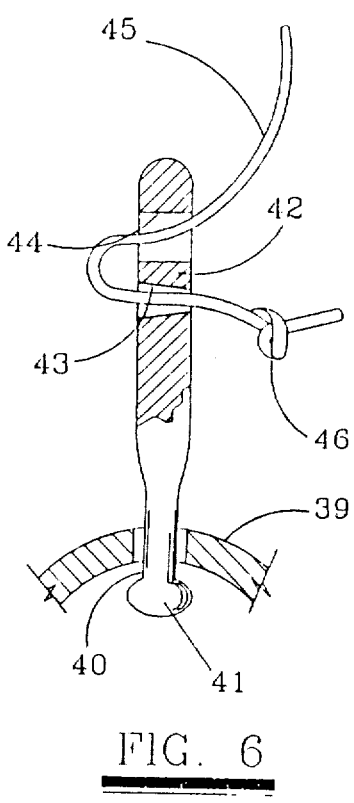
FIG. 5      FIG. 6